(12) United States Patent
Bae

(10) Patent No.: US 10,763,486 B2
(45) Date of Patent: Sep. 1, 2020

(54) BATTERY WITH SAFETY MECHANISM

(71) Applicant: DURACELL U.S. OPERATIONS, INC., Wilmington, DE (US)

(72) Inventor: In Tae Bae, New Milford, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 77 days.

(21) Appl. No.: 15/808,799

(22) Filed: Nov. 9, 2017

(65) Prior Publication Data

US 2019/0140248 A1    May 9, 2019

(51) Int. Cl.
  *H01M 2/34* (2006.01)
  *H01M 2/02* (2006.01)
  *H01M 2/30* (2006.01)

(52) U.S. Cl.
  CPC ........... *H01M 2/34* (2013.01); *H01M 2/0222* (2013.01); *H01M 2/0267* (2013.01); *H01M 2/0277* (2013.01); *H01M 2/30* (2013.01); *H01M 2200/00* (2013.01)

(58) Field of Classification Search
  None
  See application file for complete search history.

(56) References Cited

U.S. PATENT DOCUMENTS

| | | | |
|---|---|---|---|
| 6,027,326 A | 2/2000 | Cesarano, III et al. | |
| 6,401,795 B1 | 6/2002 | Cesarano, III et al. | |
| 8,288,001 B1 | 10/2012 | Fan et al. | |
| 9,130,200 B2 | 9/2015 | Dipietro et al. | |
| 9,741,975 B2 | 8/2017 | Laulicht et al. | |
| 9,865,862 B2 | 1/2018 | Ok | |
| 10,058,881 B1 | 8/2018 | Keicher et al. | |
| 2012/0244409 A1 | 9/2012 | Ok | |
| 2013/0202922 A1 | 8/2013 | Dipietro et al. | |
| 2014/0170074 A1 | 6/2014 | Ok | |
| 2016/0129634 A1 | 5/2016 | Keicher et al. | |
| 2017/0062829 A1 | 3/2017 | Ryu et al. | |
| 2017/0181291 A1 | 6/2017 | Bell et al. | |
| 2018/0062119 A1 | 3/2018 | Yagishita et al. | |
| 2018/0076467 A1 | 3/2018 | Boolish et al. | |

FOREIGN PATENT DOCUMENTS

| | | | |
|---|---|---|---|
| JP | 2017126405 A | | 7/2017 |
| JP | 2017126420 A | | 7/2017 |
| JP | 2017126421 A | * | 7/2017 |
| JP | 2017126434 A | | 7/2017 |
| JP | 2017126435 A | | 7/2017 |
| WO | WO-2013/106821 A1 | | 7/2013 |

(Continued)

OTHER PUBLICATIONS

Laulicht B et al., "Simple battery armor to protect against gastrointestinal injury from accidental ingestion," *Proceedings of the National Academy of Sciences of the United States of America* 2014;111(46):16490-16495.

(Continued)

*Primary Examiner* — Daniel S Gatewood
(74) *Attorney, Agent, or Firm* — Marshall, Gerstein & Borun LLP

(57) ABSTRACT

Batteries with a safety mechanism adapted to protect against tissue damage and/or electrolysis when the battery is exposed to an aqueous solution or a wet tissue.

21 Claims, 8 Drawing Sheets

(56) References Cited

FOREIGN PATENT DOCUMENTS

| WO | WO-2014/164098 A1 | 10/2014 |
| WO | WO-2016/179501 A1 | 11/2016 |
| WO | WO-2016/179508 A2 | 11/2016 |
| WO | WO-2017/061453 A1 | 4/2017 |
| WO | WO-2017/122250 A1 | 7/2017 |

OTHER PUBLICATIONS

International Application No. PCT/US2018/059931, International Search Report and Written Opinion, dated Feb. 14, 2019.
International Application No. PCT/US2018/059931, Written Opinion of the International Preliminary Examining Authority, dated Oct. 23, 2019.
International Preliminary Report on Patentability (IPRP) for International Appl. No. PCT/US2018/059931, dated Mar. 5, 2020.

\* cited by examiner

BATTERY WITH SAFETY MECHANISM

FIELD OF THE INVENTION

The present disclosure relates to batteries and, more particularly, to batteries with a safety mechanism adapted to protect against tissue damage and/or electrolysis, when the battery is exposed to an aqueous solution or a wet tissue.

BACKGROUND

The background description provided herein is for the purpose of generally presenting the context of the disclosure.

Electrochemical cells, often simply called batteries, are commonly used as electrical energy sources. Small batteries are especially useful in powering consumer products. Small batteries come in a variety of cell types. Common small battery cell types include AAA, AA, B, C, D, 9 V, CR2, and CR123A. Other types of small batteries known as button cells (also including wider cells sometimes referred to as coin cells) are frequently used to power a variety of products including but not limited to watches, cameras, calculators, key-less entry systems for vehicles and the like, laser pointers, glucometers, etc.

FIG. 1 illustrates the construction of a representative button cell 10 comprising a cathode 12 disposed within a cathode can 14 and an anode 16 disposed within an anode cup 18. A separator 20 physically separates and electronically insulates the anode 16 from the cathode 12. An insulating gasket 22 serves to seal the cell to prevent electrolyte loss and to prevent ingress of ambient atmospheric components into the cell and electronically insulate the cathode can 14 from the anode cup 18. Button cells usually have a long service life, for example, typically well over a year in continuous use in a wristwatch. In addition, most button cells have low self-discharge such that they hold their charge for relatively long times when not placed under load.

While button cell batteries are common in many portable consumer electronic devices, the size, shape, and appearance of these batteries, particularly coin cells having a diameter of 20 mm such as CR2016 lithium cells and CR2032 lithium cells, can pose dangers, particularly to infants, toddlers, and pets. These dangers can result in bodily harm, especially if the cell is swallowed unbeknownst to others around. And some of these button cell batteries can pose a relatively greater danger than others, which consumers may not fully appreciate. For example, 3 V coin cells batteries such as CR2016 3 V lithium cells and CR2032 3 V lithium cells, which are based on lithium-manganese dioxide chemistry, are sized such that they readily can become lodged in a human throat and thus cause electrolysis of body fluids and/or burning wet esophageal/organ tissue, for example, if swallowed. Of course, such batteries can also cause significant gastric distress if successfully swallowed.

SUMMARY OF THE INVENTION

A battery with a safety mechanism adapted to protect against tissue damage and/or electrolysis is provided. The battery comprises a housing comprising first and second poles. At least one electronic conductor is electronically coupled to one of the first and second poles. A spacer comprising an electronically insulating material is provided between the electronic conductor and the other of the first and second poles such that electronic coupling between the electronic conductor and the other of the first and second poles is prevented. The spacer is capable of undergoing a physical change in the presence of an aqueous solution such that electronic coupling between the electronic conductor and the other of the first and second poles can occur.

An additional exemplary battery with a safety mechanism adapted to protect against tissue damage and/or electrolysis is also provided. The battery with a safety mechanism comprises a housing comprising first and second poles, an electronic conductor and first and second spacers. The first and second spacers comprise an electronically insulating material. The first spacer is disposed between a first pole of the battery and the electronic conductor and the second spacer is disposed between a second pole of the battery and the electronic conductor, with the electronic conductor being disposed between and in contact with the first and second spacers. The spacers are capable of undergoing a physical change in the presence of an aqueous solution, and the electronic conductor are adapted to establish electronic contact with both the first and second poles in the presence of the aqueous solution

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings. The figures described below depict various aspects of the batteries disclosed herein. It should be understood that each figure depicts exemplary aspects of the batteries a safety mechanism adapted to protect against tissue damage and/or electrolysis disclosed herein.

DETAILED DESCRIPTION

Figure 1:
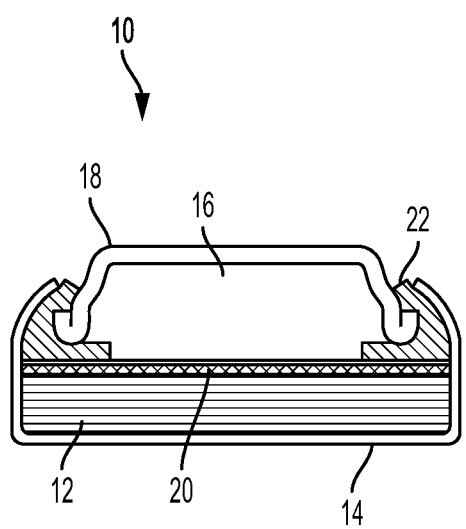
FIG. 1 illustrates a conventional button cell.

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 4th ed. 2011). Secondary batteries are intended to be recharged. Secondary batteries may be discharged and then recharged many times, e.g., more than fifty times, more than a hundred times, or more than a thousand times. Secondary batteries are described, e.g., in David Linden, Handbook of Batteries (McGraw-Hill, 4th ed. 2011). Batteries may contain aqueous or non-aqueous electrolytes. Accordingly, batteries may include various electrochemical couples and electrolyte combinations. Consumer batteries may be either primary or secondary batteries. However, because of the electrical charges stored in the batteries and because of the exposed poles, it is advantageous to protect consumer batteries, in particular small consumer batteries, against harming consumers when exposed to wet tissues. In particular, it is advantageous to protect batteries against exposing consumers to electrolysis or burns, both of which can occur when a battery is swallowed, for example. In this regard, if the positive and negative poles of a battery are exposed to wet bodily fluids, electrolysis of water can occur and result in the development of hydroxide ions and burning of tissues adjacent the negative pole, as well as potentially causing direct oxidation of tissues, particularly those tissues that are adjacent the positive pole (or cathode can). In addition, significant oxidation of the cathode can itself may lead to the formation of holes therein and thereby allow the toxic contents of the battery to be released. The present application provides safety mechanisms for shorting batteries in the presence of an aqueous solution. By shorting the batteries in the presence of an aqueous solution, the disclosed safety mechanisms advantageously reduce the cell voltage of a battery that is swallowed and thereby can effectively prevent tissue damage and other deleterious effects caused by the uncontrolled discharge of a swallowed battery.

A battery with a safety mechanism adapted to protect against tissue damage and/or electrolysis is provided. The battery includes a battery housing comprising first and second poles. At least one electronic conductor is electronically coupled to or in electronic contact with one of the first and second poles. It should be noted that the terms "electronically coupled" and "electronic contact" are used herein interchangeably to describe a relationship in which electron flow between the listed components can occur. The electronic conductor may be electronically coupled to one of the first and second poles because it is in direct physical contact therewith. Alternatively, there can be one or more additional intervening electronically conducting materials between the electronic conductor and the one of the first and second poles.

A spacer comprising an electronically insulating material is provided between the electronic conductor and the other of the first and second poles such that electronic coupling between the electronic conductor and the other of the first and second poles is prevented. The spacer is capable of undergoing a physical change (including but not limited to undergoing a chemical change leading to a change in physical properties) in the presence of an aqueous solution such that electronic coupling between the electronic conductor and the other of the first and second poles can occur.

Generally, the present disclosure provides batteries that are capable of being shorted, mechanically and/or electronically, by electronically coupling both battery poles or forming an electronic connection across both battery poles. The electronic connection across the positive and negative battery poles is formed only after the battery is exposed to a "safety condition", which refers to an ambient condition the battery encounters when becoming lodged in the throat of a person, an infant, or a pet animal. In these situations, when a person or infant or pet animal swallows a battery, the battery can be contacted with saliva, stomach fluids, or other aqueous fluids. Thus, the batteries with safety mechanisms adapted to protect against tissue damage and/or electrolysis are constructed and designed to short when in the presence of an aqueous solution. The resulting short-circuit is able to drop the voltage of the battery to below a desired threshold level to thereby reduce and/or effectively prevent the electrolysis of water and the accompanying formation of harmful electrochemically-generated ions (e.g., hydroxide ions). The desired threshold levels can vary, but in some examples detailed herein, the cell can be advantageously shorted to below 1.5 V, including below 1.4 V, below 1.3 V, below 1.2 V, below 1.1 V, below 1.0 V, below 0.9 V, below 0.8 V, below 0.7 V, below 0.6 V, below 0.5 V, below 0.4 V, below 0.3 V, below 0.2 V, below 0.1 V, and even to about 0 V. Under "normal use conditions", such as when the battery is not in use, for example, when the battery is being stored or transported, or when the battery is in operation in an electronic device, formation of the electronic connection does not occur and battery shorting is avoided.

In one embodiment, a battery according to the disclosure includes an electronic conductor that is initially in electronic contact with only one of the first and second poles of the battery. A spacer comprising an electronically insulating material prevents the electronic conductor from establishing electronic contact across both of the battery poles under normal use conditions (i.e., before the battery is contacted with an aqueous solution). On the other hand, when the battery is exposed to or contacted with an aqueous solution such as saliva, stomach fluids, water, or other aqueous fluid, the electronically insulating material can undergo a physical change, for example, the electronically insulating material can dissolve because it is soluble in the aqueous fluid. The electronic conductor is biased towards electronic contact with the other pole of the battery, but the resistive force of the spacer is greater than or equal to the biasing force of the electronic conductor under normal use conditions. After substantial dissolution of the electronically insulating material, however, there is substantially no such resistive force and the electronic conductor can establish electronic contact with the other pole of the battery, thereby short-circuiting the battery. The electronic conductor may be biased, for example, during crimping of the cathode can (or an extension thereof) and/or during crimping of an electronic conductor that is a separate discrete component from the cathode can.

In another example, a battery according to the disclosure also includes an electronic conductor that is initially in electronic contact with only one of the first and second poles of the battery. A spacer comprising an electronically insulating material prevents the electronic conductor from establishing electronic contact across both of the battery poles under normal use conditions (i.e., before the battery is contacted with an aqueous solution). On the other hand, when the battery is exposed to or contacted with an aqueous solution such as saliva, stomach fluids, water, or other aqueous fluid, the electronically insulating material can undergo a physical change, for example, the electronically insulating material can swell and/or soften in the presence of the aqueous fluid because it is comprised of a polymer that swells when exposed to the aqueous solution. The electronic conductor is biased towards electronic contact with the other pole of the battery, but the resistive force of the spacer is greater than or equal to the biasing force of the electronic conductor under normal use conditions. After swelling and/or softening of the electronically insulating material, however, the spacer resistive force is significantly decreased and mechanical deformation, strain, or displacement of the spacer may be achieved because the biasing force of the electronic conductor "overcomes," strains, or displaces the electronically insulating material of the spacer and thereby establishes an electronic connection between the two poles and short-circuits the battery. In one refinement, the electronically insulating material is a hydrogel which, in the presence of an aqueous fluid, forms a gel that is incapable of resisting the biasing force provided by the electronic conductor. The electronic conductor may be biased, for example, during crimping of the cathode can (or an extension thereof) and/or during crimping of an electronic conductor that is a separate discrete component from the cathode can.

By way of example, the electronic conductors herein may be formed of metals, for example, the electronic conductors may be formed of any suitable electronic conducting materials. Suitable electronic conducting materials for forming the electronic conductors include but are not limited to (i) metal alloys including but not limited to steels such as stainless steel, nickel-plated steel, or zinc-plated steel, (ii) conductive ceramics including but not limited to carbides, oxides, nitrides, and combinations of the foregoing, (iii) conductive polymers, (iv) conductive composites, and any combinations thereof. The electronic conductor may be biased, for example, during crimping of the cathode can (or an extension thereof) and/or during crimping of an electronic conductor that is a separate discrete component from the cathode can.

The electronic conductors disclosed herein generally have a resistivity value of less than about $5 \times 10^{-5}$ ohm·cm at 20° C., or less than $2.5 \times 10^{-5}$ ohm·cm at 20° C., or from about $0.5 \times 10^{-5}$ ohm·cm at 20° C. to about $5 \times 10^{-5}$ ohm·cm at 20° C. In some examples, the resistance of the electronic conductor is less than 20 Ohms, less than 10 Ohms, or less than 5 Ohms, for example, the resistance may be about 10 Ohms, about 5 Ohms, or about 1 Ohm. In some examples, the resistance of the electronic conductor is from about 0.1 Ohms to about 20 Ohms.

The resistance of the electronically insulating material is always greater than the resistance of the electronic conductor. In some examples, the resistance of the electronically insulating material is greater than 0.5 MOhms, greater than 5 MOhms, greater than 10 MOhms, greater than 100 MOhms, or greater than 500 MOhms, for example, the resistance of the electronically insulating material may be about 1 MOhm, about 20 MOhms, about 200 MOhms, or about 1000 MOhms. In some examples, the resistance of the electronic conductor is from about 0.5 MOhms to about 1000 MOhms.

The electronically insulating material of the spacer can be formed of any number of electronically insulating materials capable of undergoing a physical change (including but not limited to electronically insulating materials that undergo a chemical change leading to a change in physical properties) when in the presence of water including but not limited to suitable water-softenable materials, suitable water-soluble, and/or water-swellable materials. The term "water-softenable" as used herein refers to a material having a Young's modulus that decreases in the presence of an aqueous solution. Useful water-softenable materials have a Young's modulus that is sufficiently high to provide a resistive force greater than a biasing force of an electronic conductor under normal use conditions. Useful water-softenable materials, after being in the presence of an aqueous solution, also have a Young's modulus that is sufficiently low to allow the material to sufficiently deform when the biasing force of the electronic conductor is applied thereto, such that electronic coupling between the electronic conductor and the other of the first and second battery poles can be established. Useful water-softenable materials also generally have a Young's modulus that decreases to a range between 0.0003 and 0.15 GPa after being in the presence of an aqueous solution. Various testing systems can be used to determine the elastic modulus, for example, the 8802 servohydraulic testing system available from Instron. The water-softenable material may be a water-soluble material. Useful water-soluble materials have a solubility in water of greater than 50 mg/L, greater than 100 mg/L, greater than 500 mg/L, or even greater than greater than 1000 mg/L. Useful water-swellable materials generally are able to absorb more than 30 wt. % in pure water, preferably at least 100% by weight in water. Useful water-swellable materials, after being in the presence of an aqueous solution, allow the material to sufficiently deform when the biasing force of the electronic conductor is applied thereto, such that electronic coupling between the electronic conductor and the other of the first and second battery poles can be established.

The electronically insulating material may be present in an amount between 5 wt. % and 100 wt. %, for example between 10 wt. % and 99 wt. %, between 50 wt. % and 99 wt. %, and/or between 70 wt. % and 99 wt. %, based on the weight of the spacer (i.e., based upon the weight of the solids used to provide the spacer). Any number of water-softenable, water-soluble, and/or water-swellable polymers may be used, alone or in combination, to form the spacer. Non-limiting examples of water-soluble, water-soluble, and/or water-swellable materials include but are not limited to sugar, polyethers such as polyethylene glycols (PEGS) and polyethylene oxides (PEO), polyacrylic acids (PAA), polyamides (PA), polyacrylates, polyvinyl alcohols and modified polyvinyl alcohols, acrylate copolymers, polyvinyl pyrrolidone, pullulan, gelatin, carboxymethyl cellulose (CMC), hydroxylpropylmethyl cellulose (HPMC), hydroxypropylcellulose, polysaccharides, natural polymers including, but not limited to, agar, guar gum, xanthan gum, locust bean gum, carrageenan, and starch, modified starches including, but not limited to, ethoxylated starch and hydroxypropylated starch, copolymers of the foregoing, salts thereof, and combinations of any of the foregoing. The water-softenable, water soluble and/or water-swellable material preferably is a biologically inert material, with no toxicity or little toxicity.

Benign solids such as $NaHPO_4$, sodium chloride (NaCl), potassium chloride (KCl), baking soda, sugar, sugar-like substances, and citric acid optionally can be included in combination with the electronically insulating material so as to provide the spacer. The benign solids may be present in an amount between 0 wt. % and 30 wt. %, for example between 0 wt. % and 20 wt. %, between 1 wt. % and 30 wt.

%, and/or between 1 wt. % and 20 wt. %, based on the weight of the spacer (i.e., based upon the weight of the solids used to provide the spacer).

Figure 2A:
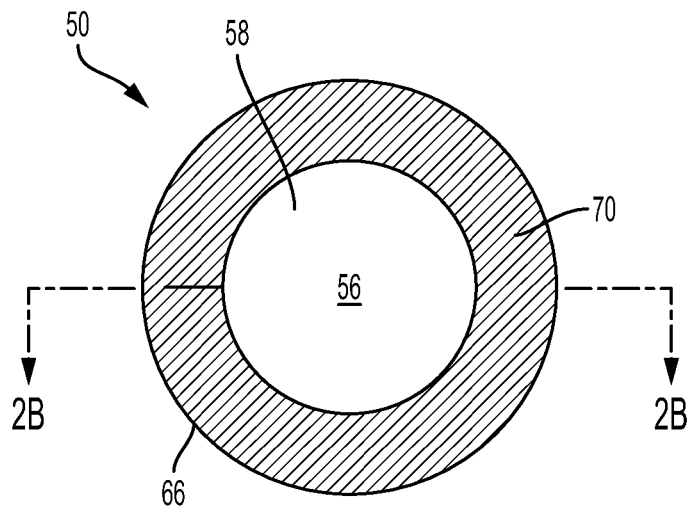
FIGS. 2A and 2B illustrate a battery, in the form of a coin cell, having a safety mechanism adapted to protect against tissue damage and/or electrolysis, in accordance with an exemplary embodiment according to the disclosure.
Figure 2B:
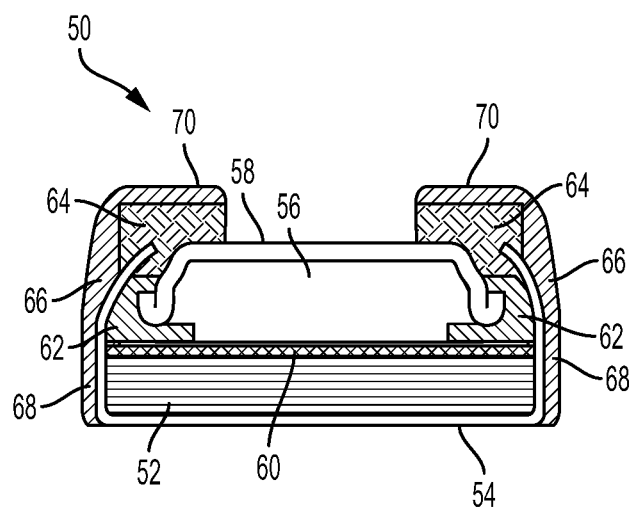

FIGS. 2A and 2B illustrate a battery 50, which may be any type of primary or secondary battery and which is a coin cell type battery in the illustrated example. The battery 50 includes a battery housing surrounding the battery. The battery housing comprises a cathode can 54 and an anode cup 58. A cathode 52 is disposed in the cathode can 54 and an anode 56 is disposed in the anode cup 58. The cathode 52 and the anode 56 are separated electronically by a separator 60 within the battery 50. Each of the cathode can 54 and the anode cup 58 forms a different pole of the battery 50, with the cathode can 54 forming a positive pole and the anode cup 58 forming a negative pole.

The cathode 52 and the anode 56 are spaced apart by an insulating separator 60 extending across the lateral extent of the cathode 52, e.g., substantially across a diameter of the battery 50. The insulating separator 60 is fabricated from a material capable of freely conducting ions there through. An insulating gasket 62 electronically isolates the cathode can 54 from the anode cup 58, the insulating gasket 62 preventing any part of the anode cup 58 from contacting the cathode can 54 and sealing the battery 50 to prevent electrolyte loss.

In the illustrated embodiment, the insulating gasket 62 extends into the cathode can 54 and entirely surrounds the anode cup 58 such that it cannot contact the cathode can 54, but a reverse configuration in which the anode cup 58 surrounds the cathode can 54 and the insulating gasket 62 extends into the anode cup 58 and entirely surrounds the cathode can 54 may also be used. It should be understood that while each of the illustrated embodiments expressly shown herein (including as shown in FIGS. 2A, 2B, 4A, 4B, 5A, 5B, 6A, and 6B) includes the insulating gasket 62 (or corresponding reference no.) extending into the cathode can 54 (or corresponding reference no.) and entirely surrounding the anode cup 58 (or corresponding reference no.) such that it cannot contact the cathode can 54 (or corresponding reference no.), batteries with safety mechanisms in which the reverse configuration is used are contemplated.

The battery 50 further includes an exemplary safety mechanism adapted to protect against tissue damage and/or electrolysis according to the disclosure, the safety mechanism including an electronic conductor 66 extending entirely or partially around an outer edge of the cathode can 54. The electronic conductor 66 may be formed of a metal, for example, a metal alloy material, as described above. The electronic conductor 66 includes an attaching segment 68 that is fixedly mounted to an outer surface of the cathode can 54. The electronic conductor 66 may be mounted to the cathode can by any suitable interconnection. For example, the attaching segment 68 may be attached via an interference fit with a groove (not shown) along the exterior wall of the cathode can 54 for a mechanically secure attachment. In other examples, the attaching segment 68 may be attached to the exterior side wall of the cathode can 54 by application of an adhesive or by forming a welding joint.

In the reverse configuration (not shown, briefly described above) in which the insulating gasket 62 extends into the anode cup 58 and surrounds the cathode can 54 such that it cannot contact the anode cup 58, the electronic conductor 66 extends entirely or partially around an outer edge of the anode cup 58 and may be secured thereto as described in connection with the cathode can 54 above.

As illustrated in FIG. 2B, the attaching segment 68 of the electronic conductor 66 is electronically coupled to the cathode can 54. In the illustrated form, the electronic conductor 66 is in direct physical contact with the cathode can 54. The electronic conductor 66 further includes a grounding segment 70 extending from the attaching segment 68. Typically, the grounding segment 70 extends in an orthogonal or substantially orthogonal direction relative to the attaching segment 68.

The grounding segment 70 is spaced from the anode cup 58 during normal operation of the battery 50, so as not to electronically couple the positive and negative poles and thereby short the battery 50 during normal operation of the battery 50. In the illustrated example, the spacing between the grounding segment 70 and the anode cup 58 is achieved by providing a spacer 64 comprising an electronically insulating material between the grounding segment 70 and the anode cup 58. As illustrated in FIG. 2B, the spacer is disposed between an overhang portion of the grounding segment 70 and the other of the first and second poles, here the anode cup 58, such that the grounding segment 70 of the electronic conductor 66 is not electronically coupled to the anode cup 58 (and thus the negative pole of the battery 50) when the spacer 64 is present such as during normal use conditions. The spacer 64 may extend to or even beyond a distal overhang portion of the grounding segment 70.

The spacer 64 may comprise a material capable of undergoing a physical change, e.g., by dissolution after being exposed to a safety condition, typically, saliva, stomach fluids, or other aqueous fluids, such that after dissolution of the spacer 64, a biasing force of the electronic conductor 66 can cause the grounding segment 70 to come into electronic contact with the anode cup 58 (e.g., an upper top surface or a side wall surface thereof) to short out the battery 50. In other examples, the spacer 64 may comprise a material capable of being overcome, strained, or displaced, for example, because the spacer 64 softens, swells, or otherwise mechanically weakens in response to being exposed to a safety condition, typically, saliva, stomach fluids, or other aqueous fluids. The spacer 64 may be mechanically weakened, for example, when an aqueous fluid comes into contact with the battery 50 and is absorbed by the spacer 64 such that the spacer 64 softens, swells and/or forms a gel. As a result of such mechanical weakening of the spacer 64, a biasing force of the electronic conductor 66 can cause the grounding segment 70 to engage and come into electronic contact with the anode cup 58 to thereby short out the battery 50, for example, during a safety condition (or other contact of the battery 50 with an aqueous fluid). As discussed above, a safety condition can occur when a person, infant, or pet animal swallows the battery 50, exposing the battery 50 to an aqueous solution in the form of saliva or stomach fluid. In the illustrated embodiment, the insulating gasket 62 is shown as a separate component from spacer 64 such that it can remain intact after the battery 50 is contacted with an aqueous fluid and the spacer undergoes a physical change, keeping the cathode 52 and anode 56 materials inside the battery 50. However, in another embodiment, the insulating gasket 62 and spacer 64 can be of unitary construction, with the spacer 62 functioning as and effectively providing an insulating gasket 64 as well. Thus, in this embodiment, a separate insulating gasket 64 is not present and the spacer 62 comprising an electronically insulating material, in addition to being disposed between the grounding segment 70 and the anode cup 58, also extends into the cathode can 54 and entirely surrounds the anode cup 58 such that the anode cup 54 cannot contact the cathode can 54. Of course, batteries with safety mechanisms in which the reverse configuration is used are contemplated as noted above.

As shown in the example illustrated in FIG. 2B, the electronic conductor 66 includes two segments, attaching segment 68 and grounding segment 70. Each segment 68, 70 is electronically coupled to a first pole of the battery 50 (e.g., the cathode can 54) and each segment 68, 70 is electronically isolated from a second pole of the battery 50 (e.g., the anode cup 58) by the spacer 64. In the illustrated embodiment, the attaching segment 68 is electronically coupled to (and indeed in direct physical contact with) the cathode can 54, i.e., the positive battery pole, and the grounding segment 70 of the electronic conductor 66 is not in electronic contact with but is biased toward engagement with the anode cup 58, i.e., the negative battery pole.

It will be appreciated that either of the positive pole or the negative pole of the battery 50 may be electronically connected to the electronic conductor 66, with the other of the two poles being electronically isolated from the tensioned conductor 66 under normal use or storage conditions. It will be further appreciated that the spacer 64 may therefore be disposed adjacent to either the positive pole or the negative pole of the battery 50, to prevent electronic contact of the electronic conductor 66 therewith under normal use or storage conditions. Thus, it is also contemplated that the electronic conductor 66 may alternatively be positioned about battery 50 such that it is electronically coupled to (e.g., in direct physical contact with) a top surface of the anode cup 58 and spaced away from a sidewall of the cathode can 54 by a spacer 64 disposed between the electronic conductor 66 and the cathode can 54 during normal use conditions.

Further still, while the attaching segment 68 and the grounding segment 70 are shown in the illustrated example as being of unitary construction and thus directly connected to one another such that they are continuously electronically coupled to one another, in other examples, the attaching segment 68 and the grounding segment 70 of a battery safety mechanism (not shown) may be electronically isolated from one another during normal operation of the battery, only to become electronically coupled to one another during a safety condition, such as in response to the presence of an aqueous solution or bodily fluid. Thus, in another example, the attaching segment 68 may be in electronic contact with either the positive pole or the negative pole of the battery 50 and the grounding segment 70 may be in electronic contact with the other of the positive pole and the negative pole of the battery 50, with the spacer 64 comprising an insulator material being positioned between the two segments 68, 70, such that the segments 68, 70 are not electronically coupled to one another (and thus the positive and negative poles are not electronically coupled to one another) during normal operation of the battery. After encountering a safety condition (or other contact of the battery 50 with an aqueous fluid) so as to effect dissolution, softening, and/or swelling of the electronically insulating material of the spacer 64, the grounding segment 70 can engage and come into electronic contact with the attaching segment 68 to thereby short out the battery 50. As discussed above, a safety condition can occur when a person, infant, or pet animal swallows the battery 50, exposing the battery 50 to an aqueous solution in the form of saliva or stomach fluid.

Figure 3:
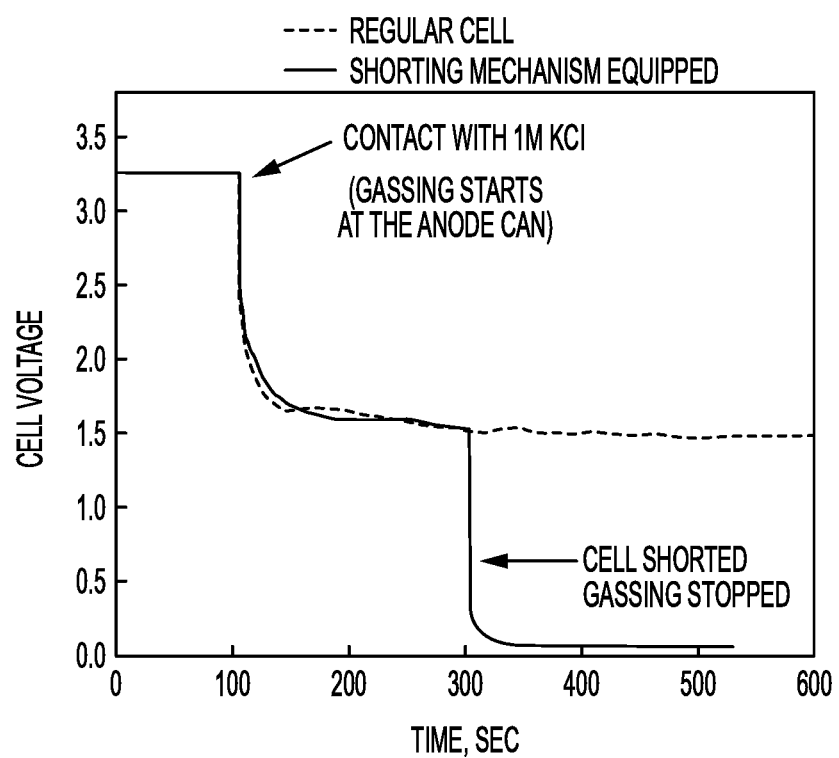
FIG. 3 illustrates a plot of cell voltage versus time for two different batteries, the first being a conventional coin cell battery and the second being a coin cell battery having a safety mechanism adapted to protect against tissue damage and/or electrolysis in accordance with an exemplary embodiment according to the disclosure.

FIG. 3 illustrates a plot of cell voltage versus time for two different batteries, a conventional button cell battery (in this example, a button cell battery DL2032 available from Duracell Inc.) and a comparable button cell battery further equipped with a safety mechanism adapted to protect against tissue damage and/or electrolysis according to the disclosure, such as battery 50 depicted in FIGS. 2A and 2B. After contacting the batteries with a 1 M KCl solution for about 100 seconds, gassing started at the anode cup 58, and the actual cell voltages of the tested batteries dropped, as the batteries began to short. In the conventional battery, the voltage drop stops at around 1.5 V after around 300 seconds. A 1.5 V voltage, although reduced, is sufficient to cause the electrolysis of water and generation of hydroxide ions. Thus, even though reduced, this voltage can cause burning and damage to esophageal tissues should the battery should become lodged in a human throat. Of course, the battery could also cause significant stomach distress if successfully swallowed. The battery 50 with the safety mechanism adapted to protect against tissue damage and/or electrolysis, by contrast, is further shorted such that the electrolysis of water substantially no longer occurs at the anode cup 58. Indeed, in the illustrated example, the safety mechanism further short circuits the battery 50 substantially completely to almost 0V. In the example illustrated in FIG. 3, a spacer 64 comprising an electronically insulating material that is a water-soluble material capable of being dissolved in saliva, stomach fluids, or other aqueous fluid was used. Specifically, the spacer 64 of the battery 50 with safety mechanism illustrated in FIG. 3 comprised a benign solid, in this case a benign salt, specifically, $NaHPO_4$ (about 10 wt. %), and a water-soluble material, specifically, polyacrylic acid (about 90 wt. %).

Figure 4A:
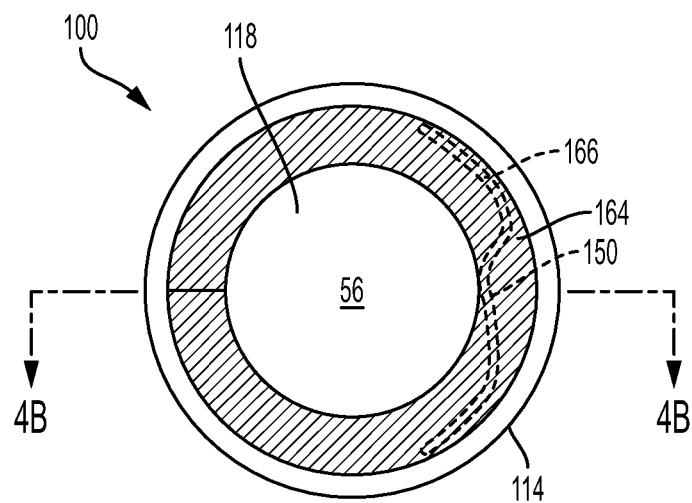
FIGS. 4A and 4B illustrate another battery, in the form of a coin cell, having a safety mechanism adapted to protect against tissue damage and/or electrolysis in accordance with another exemplary embodiment according to the disclosure.
Figure 4B:
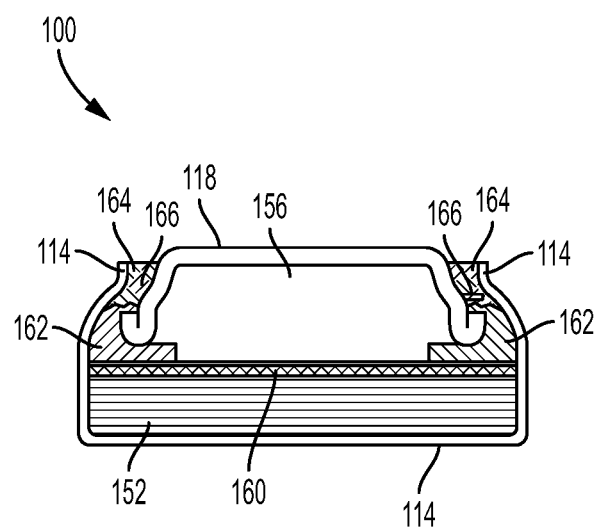

In FIGS. 4A and 4B, another example battery 100, also illustrated as a button cell battery, includes a cathode can 114 and an anode cup 118. A cathode 152 is disposed in the cathode can 114 and an anode 156 is disposed in the anode cup 118. The cathode 152 and the anode 156 are separated electronically by a separator 160 within the battery 100. Each of the cathode can 114 and the anode cup 118 forms a different pole of the battery 100, with the cathode can 114 forming a positive pole and the anode cup 118 forming a negative pole. An insulating gasket 162 electronically isolates the cathode can 114 from the anode cup 118, the insulating gasket 162 preventing any part of the anode cup 118 from contacting the cathode can 114 and sealing the battery 100 to prevent electrolyte loss. The battery 100 shares many of the same elements shown in connection with battery 50 described above in FIGS. 2A and 2B and, as such, generally only the differences are discussed herein.

The battery 100 further includes a safety mechanism adapted to protect against tissue damage and/or electrolysis comprising a spacer 164, the spacer 164 comprising an electronically insulating material that is capable of undergoing a physical change subsequent to exposure to an aqueous solution such as saliva, stomach fluids, water, or other aqueous fluid, and an electronic conductor 166 embedded or disposed within the spacer 164. The spacer 164 is disposed above the insulating gasket 162, and functions similarly to the insulating gasket 162 during normal operation, in that the spacer 164 electronically isolates the cathode can 114 from the anode cup 118. In the illustrated example, the electronic conductor 166 embedded or disposed within the spacer 164 makes direct physical contact with and thus is electronically coupled to one of the first and second battery poles, here the anode cup 118, while being electronically separated from the other of the first and second battery poles, here the cathode can 114, by the spacer 164. In this example, the electronic conductor 166 is electronically coupled to the anode cup 118 at contact location 150. Similar to the electronic coupling between the cathode can 54 and the electronic conductor 66 illustrated in battery 50 shown in FIGS. 2A and 2B, the electronic coupling between the electronic conductor 166 and the anode cup 118 can be a fixed direct physical connection maintained throughout operation of the battery 100, both during normal operation and storage, and subsequent to the battery 100 encountering a safety condition. The connection between the electronic conductor 166 and anode cup 118 at contact location 150 can be fixed, for example, by a welding operation or a mechanical connection.

In the illustrated form, the electronic conductor 166 extends from the contact location 150 into two branching arm segments that traverse a portion of the distance between the anode cup 118 and the cathode can 114 and are biased towards engagement with the cathode can 114. While in this example, only a single electronic conductor 166 is shown, one or more of such electronic conductors 166 may be included. After coming into contact with an aqueous solution such as saliva, stomach fluids, water, or other aqueous fluid, dissolution, softening, and/or swelling of the spacer 164 occurs, such that the electronic conductor 166 is able to deflect into electronic contact with the cathode can 114, thereby electronically coupling the cathode can 114 to the anode cup 118. As a result, the battery 100 is shorted and the consumer is protected during a safety condition, such as if the battery 100 has been swallowed by a person or pet animal. In the illustrated embodiment, the insulating gasket 162 is shown as a separate component from spacer 164 such that it can remain intact after the battery 100 is contacted with an aqueous fluid, keeping the cathode 152 and anode 156 materials inside the battery 100. However, in another embodiment, the insulating gasket 162 and spacer 164 can be of unitary construction, with the spacer 164 additionally functioning as and effectively providing an insulating gasket 162 as noted with the spacer 64 and the insulating gasket 62 described in connection with FIGS. 2A and 2B above.

In this example, the electronic conductor 166 may be partially or wholly embedded or disposed within the spacer 164, as long as the resistive force of the spacer 164 is greater than or equal to a biasing force of the electronic conductor 166 such that the electronic conductor does not deflect into electronic contact with the cathode can 114 under normal use conditions. Thus, it should be noted the electronic conductor 166 can be biased toward engagement with the cathode can 114, for example, the electronic conductor 166 can be biased towards engagement with an inner surface of the cathode can 114. Of course, the opposite configuration in which the electronic conductor 166 makes direct physical contact with and thus is electronically coupled to the cathode can 114, while being electronically separated from the anode cup 118 by the spacer 164 is also contemplated.

Figure 5A:
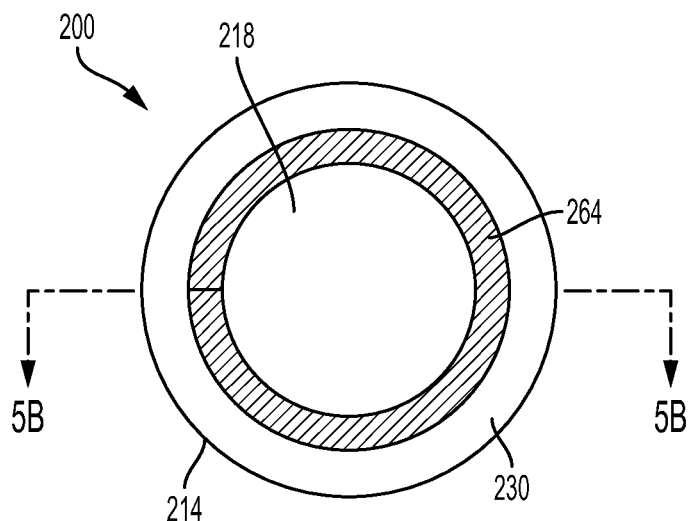
FIGS. 5A and 5B illustrate another battery, in the form of a coin cell, having a safety mechanism adapted to protect against tissue damage and/or electrolysis in accordance with an additional exemplary embodiment according to the disclosure.
Figure 5B:
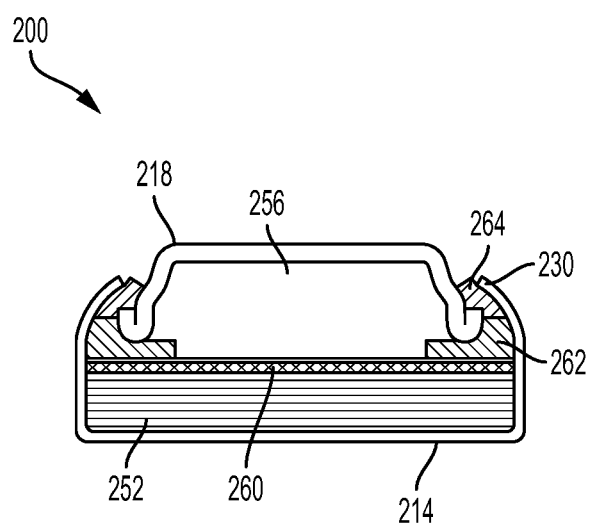

FIGS. 5A and 5B illustrate an exemplary battery 200 with a safety mechanism adapted to protect against tissue damage and/or electrolysis according to the disclosure. The battery 200 includes a cathode can 214 and an anode cup 218. A cathode 252 is disposed in the cathode can 214 and an anode 256 is disposed in the anode cup 218. The cathode 252 and the anode 256 are separated electronically by a separator 260 within the battery 200. Each of the cathode can 214 and the anode cup 218 forms a different pole of the battery 200, with the cathode can 214 forming a positive pole and the anode cup 218 forming a negative pole. An insulating gasket 262 electronically isolates the cathode can 214 from the anode cup 218, the insulating gasket 262 preventing any part of the anode cup 218 from contacting the cathode can 214 and sealing the battery 200 to prevent electrolyte loss. The battery 200 shares many of the same elements shown in connection with battery 50 described above in FIGS. 2A and 2B and, as such, generally only the differences are discussed herein.

The first battery pole, here the cathode can 214, includes an electronic conductor 230 that is integrated into the cathode can 214 as a continuation or extension thereof. Thus, whereas the electronic conductor 66 is illustrated in FIG. 2B as a component separate from the cathode can 54, the electronic conductor 230 and the cathode can 214 are of unitary construction, for example, the electronic conductor 230 comprises a continuation or extension of the cathode can 214 that can electronically couple to the second battery pole, here an exterior surface of the anode cup 218, in order to short the battery 200 subsequent to the battery being exposed to an aqueous solution such as saliva, stomach fluids, water, or other aqueous fluid. The electronic conductor 230 may have a protrusion (not shown) that will facilitate electronic contact with the other battery pole an outer wall of the anode cup 218 subsequent to the battery 200 encountering a safety condition.

In the embodiment illustrated in FIGS. 5A and 5B, the electronic conductor 230 of the cathode can 214 is separated from the anode cup 218 by a spacer 264 comprising an electronically insulating material. The spacer 264 is integrated into a seal region of the battery 200, the spacer 264 being disposed between the electronic conductor 230 and an outer wall of the anode cup 218, thereby preventing electronic contact between the electronic conductor 230 and the anode cup 218. Under normal use conditions, the spacer 264 may provide a further seal to the battery 200 that also includes a common insulating gasket 262 as mentioned above. In concert, the spacer 264 and the insulating gasket 262 prevent an electronic connection between the anode cup 218 and the cathode can 214, such that these two components are electronically isolated from one another under normal use conditions. After the battery 200 is exposed to aqueous solutions or bodily fluids and upon dissolution, softening, and/or swelling of the electronically insulating material of the spacer 264, the continuation or extension 230 of the cathode can 214 can be biased towards engagement with an outer wall of the anode cup 218 and can contact and thus become electronically coupled to the anode cup 218. As a result, the battery 200 is shorted and the consumer is protected during a safety condition, such as if the battery 200 has been swallowed by a person or pet animal. In the illustrated embodiment, the insulating gasket 262 is shown as a separate component from spacer 264 such that it can remain intact after the battery 200 is contacted with an aqueous fluid, keeping the cathode 252 and anode 256 materials inside the battery 200. However, in another embodiment, the insulating gasket 262 and spacer 264 can be of unitary construction, with the spacer 264 additionally functioning as and effectively providing an insulating gasket 262 as noted with the spacer 64 and the insulating gasket 62 described in connection with FIGS. 2A and 2B above.

Typically, the integrated continuation or extension 230 of the cathode can 214 is formed during a crimping process when the battery 200 is manufactured. In the illustrated example, the continuation or extension 230 of the cathode can 214 is formed as an extending part of a sidewall of the cathode can 214. The continuation or extension 230 includes a bend and is biased toward engagement with the anode cup 218. The continuation or extension 230 can be pre-cut to form a biased electronic conductor, for example.

Figure 6A:
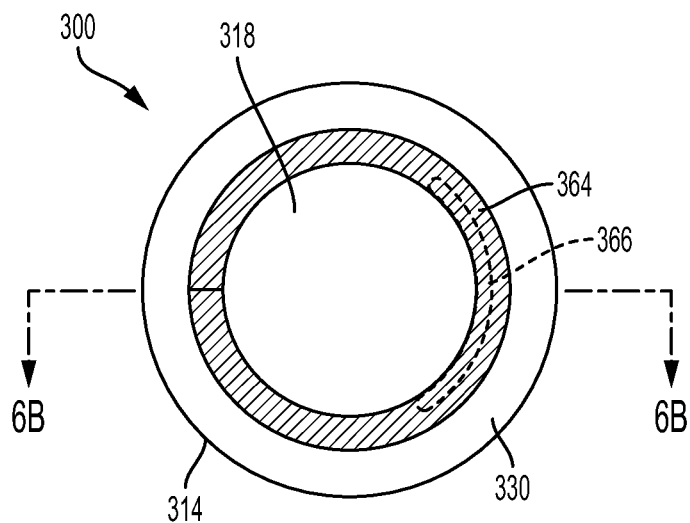
FIGS. 6A and 6B illustrate another battery, in the form of a coin cell, having a safety mechanism adapted to protect against tissue damage and/or electrolysis in accordance with another exemplary embodiment according to the disclosure.
Figure 6B:
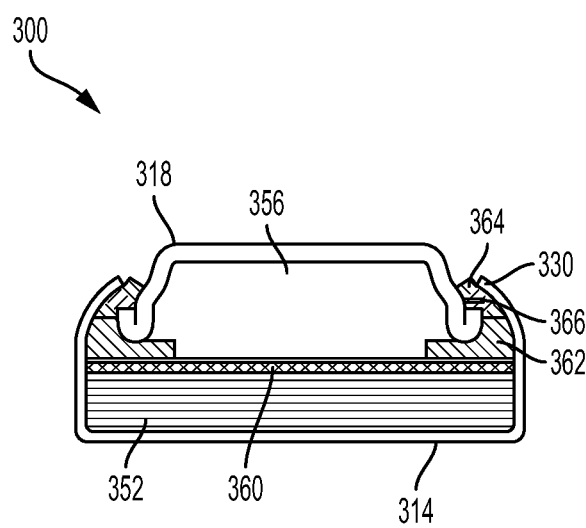

FIGS. 6A and 6B illustrate an exemplary battery 300 with a safety mechanism adapted to protect against tissue damage and/or electrolysis according to the disclosure. The battery 300 includes a cathode can 314 and an anode cup 318. A cathode 352 is disposed in the cathode can 314 and an anode 356 is disposed in the anode cup 318. The cathode 352 and the anode 356 are separated electronically by a separator 360 within the battery 300. Each of the cathode can 314 and the anode cup 318 forms a different pole of the battery 300, with the cathode can 314 forming a positive pole and the anode cup 318 forming a negative pole. An insulating gasket 362 electronically isolates the cathode can 314 from the anode cup 318, the insulating gasket 362 preventing any part of the anode cup 318 from contacting the cathode can 314 and sealing the battery 300 to prevent electrolyte loss. The battery 300 shares many of the same elements shown in connection with battery 50 described above in FIGS. 2A and 2B and, as such, generally only the differences are discussed herein.

Battery 300 has features similar to those of batteries 100 and 200 (illustrated in FIGS. 3A, 3B, 4A and 4B). As shown in FIG. 6B, battery 300 differs from battery 200 in that the safety mechanism includes a second electronic conductor 366, which may be embedded or disposed within spacer 364 and may extend around the entire circumference of the anode cup 318 or may extend along only a portion of the anode cup 318 circumference. The second electronic conductor 366 makes direct physical contact with and thus is electronically coupled to the anode cup 318, while being electronically isolated from the first conductor 330 and thus the cathode can 314 by the spacer 364. After the battery 300 is exposed to aqueous solutions or bodily fluids and upon dissolution, softening, and/or swelling of the electronically insulating material of the spacer 364, the continuation or extension 330 of the cathode can 314 can be biased towards engagement with an outer wall of the anode cup 318 and can contact and thus become electronically coupled to the anode cup 318. In addition, after the battery comes into contact with an aqueous solution such as saliva, stomach fluids, water, or other aqueous fluid, such that dissolution, softening, and/or swelling of the spacer 364 occurs, the electronic conductor 366 is able to deflect into electronic contact with the cathode can 314, thereby electronically coupling the cathode can 314 to the anode cup 318. As a result of these interactions, the battery 300 is shorted and the consumer is protected during a safety condition, such as if the battery 300 has been swallowed by a person or pet animal. In the illustrated embodiment, the insulating gasket 362 is shown as a separate component from spacer 364 such that it can remain intact after the battery 300 is contacted with an aqueous fluid, keeping the cathode 352 and anode 356 materials inside the battery 300. However, in another embodiment, the insulating gasket 362 and spacer 364 can be of unitary construction, with the spacer 364 additionally functioning as and effectively providing an insulating gasket 362 as noted with the spacer 64 and the insulating gasket 62 described in connection with FIGS. 2A and 2B above.

Figure 7:
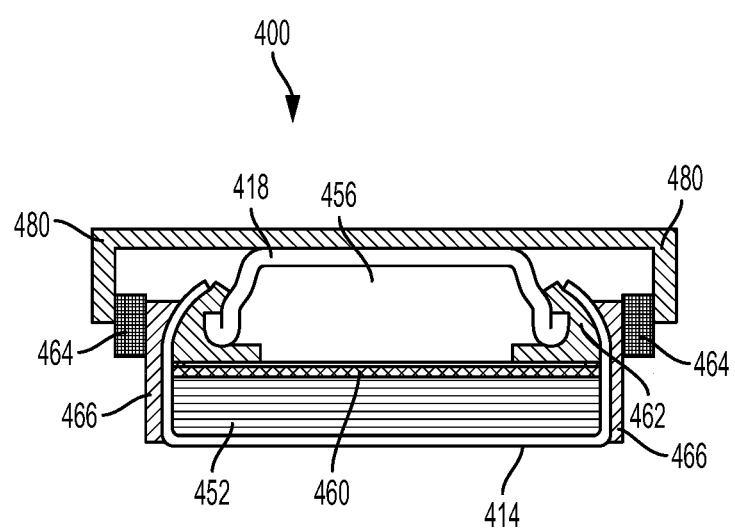
FIG. 7 illustrates another battery, in the form of a coin cell, having a safety mechanism adapted to protect against tissue damage and/or electrolysis in accordance with another exemplary embodiment according to the disclosure.

FIG. 7 illustrates an additional exemplary battery 400 with a safety mechanism adapted to protect against tissue damage and/or electrolysis according to the disclosure. The battery 400 includes a cathode can 414 and an anode cup 418. A cathode 452 is disposed in the cathode can 414 and an anode 456 is disposed in the anode cup 418. The cathode 452 and the anode 456 are separated electronically by a separator 460 within the battery 400. Each of the cathode can 414 and the anode cup 418 forms a different pole of the battery 400, with the cathode can 414 forming a positive pole and the anode cup 418 forming a negative pole. An insulating gasket 462 electronically isolates the cathode can 414 from the anode cup 418, the insulating gasket 462 preventing any part of the anode cup 418 from contacting the cathode can 414 and sealing the battery 400 to prevent electrolyte loss. The battery 400 shares many of the same elements shown in connection with battery 50 described above in FIGS. 2A and 2B and, as such, generally only the differences are discussed herein.

As shown in FIG. 7, battery 400 includes a first electronic conductor 466 in electronic contact with a cathode can 414 and a second electronic conductor 480 in electronic contact with an anode cup 418. A spacer 464 is disposed between the first electronic conductor 466 and the second electronic conductor 480. After the battery 400 is exposed to aqueous solutions or bodily fluids and upon dissolution, softening, and/or swelling of the electronically insulating material of the spacer 464, the second electronic conductor 480 can be biased towards engagement with the first electronic conductor such that the second electronic conductor 480 can contact the first electronic conductor 466 and thus electronically couple the cathode can 414 to the anode cup 418. As a result of these interactions, the battery 400 is shorted and the consumer is protected during a safety condition, such as if the battery 400 has been swallowed by a person or pet animal. In the illustrated embodiment, the cathode can 414 and the first electronic conductor are shown as separate components, however, it should be understood that the electronic conductor 466 and the cathode can 414 may be of unitary construction such that the cathode can 414 itself additionally functioning and effectively providing an electronic conductor 466. Thus, in this embodiment, a separate electronic conductor 466 is not needed.

Figure 8:
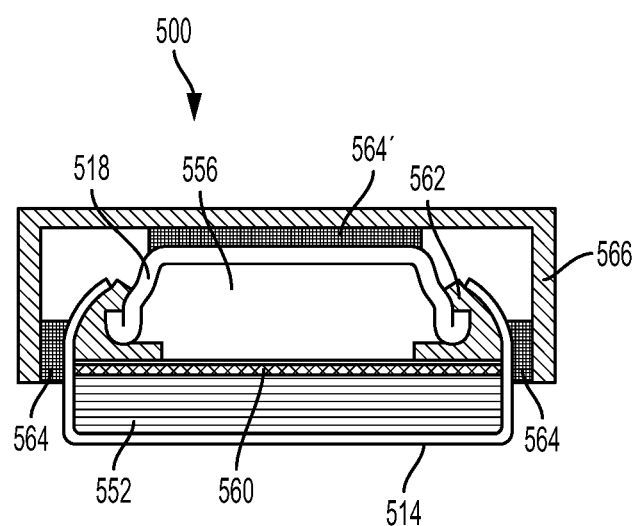
FIG. 8 illustrates another battery, in the form of a coin cell, having a safety mechanism adapted to protect against tissue damage and/or electrolysis in accordance with another exemplary embodiment according to the disclosure.

FIG. 8. illustrates an additional exemplary battery 500 with a safety mechanism adapted to protect against tissue damage and/or electrolysis according to the disclosure. The battery 500 includes a cathode can 514 and an anode cup 518. A cathode 552 is disposed in the cathode can 514 and an anode 556 is disposed in the anode cup 518. The cathode 552 and the anode 556 are separated electronically by a separator 560 within the battery 500. Each of the cathode can 514 and the anode cup 518 forms a different pole of the battery 500, with the cathode can 514 forming a positive pole and the anode cup 518 forming a negative pole. An insulating gasket 562 electronically isolates the cathode can 514 from the anode cup 518, the insulating gasket 562 preventing any part of the anode cup 518 from contacting the cathode can 514 and sealing the battery 500 to prevent electrolyte loss. The battery 500 shares many of the same elements shown in connection with battery 50 described above in FIGS. 2A and 2B and, as such, generally only the differences are discussed herein.

As shown in FIG. 8, battery 500 includes a first spacer 564 and a second spacer 564'. The spacer 564 may comprise discrete sections or a continuous circumferential layer about the cathode can 514. Similarly, the spacer 564' may comprise a continuous layer or discrete sections. The spacers 564 and 564' are disposed between the cathode can 514 and the anode cup 518 (corresponding to first and second battery poles) and the electronic conductor 566. After the battery 500 is exposed to aqueous solutions or bodily fluids and upon dissolution, softening, and/or swelling of the electronically insulating material of the spacers 564 and 564', the electronic conductor 566 can be biased towards engagement with the cathode can 514 and the anode cup 518, thus electronically coupling the cathode can 514 and the anode cup 518. As a result of these interactions, the battery 500 is shorted and the consumer is protected during a safety condition, such as if the battery 500 has been swallowed by a person or pet animal.

Throughout this specification, plural instances may implement components or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments described herein use the terms "coupled" and/or "connected". For example, some embodiments are described using the term "coupled" or "connected" to describe two or more elements that are shown in direct physical or electronic contact. The terms "coupled" and "connected," however, may also mean that two or more elements are not in direct physical contact with each other, but still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, an element A or B is satisfied by any one of the following: A is present and B is not present, A is not present and B is present, and both A and B are present.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

What is claimed:

1. A battery with a safety mechanism adapted to protect against tissue damage and/or electrolysis comprising:
   a housing comprising first and second poles, at least one electronic conductor in electronic contact with one of the first and second poles, and a spacer comprising an electronically insulating material, wherein the spacer is provided between the electronic conductor and the other of the first and second poles such that electronic contact between the electronic conductor and the other of the first and second poles is prevented, the spacer being capable of undergoing a physical change in the presence of an aqueous solution such that the spacer can dissolve, soften, or swell and electronic coupling between the electronic conductor and the other of the first and second poles can occur wherein:
   subsequent to the physical change, electronic coupling occurs based on (i) direct physical contact between the electronic conductor and the other of the first or second poles or (ii) indirect physical contact between the electronic conductor and the other of the first and second poles via one or more additional intervening electronically conducting materials disposed between the electronic conductor and the other of the first or second poles.

2. The battery with a safety mechanism adapted to protect against tissue damage and/or electrolysis of claim 1, wherein the electronic conductor is adapted to establish electronic contact with the other of the first and second poles and thereby short the battery after the battery is in the presence of the aqueous solution.

3. The battery with a safety mechanism adapted to protect against tissue damage and/or electrolysis of claim 1, wherein the first pole is a positive pole and the at least one electronic conductor is in electronic contact with the positive pole, and wherein the electronic conductor is adapted to establish electronic contact with the negative pole and thereby short the battery after the battery is in the presence of the aqueous solution.

4. The battery with a safety mechanism adapted to protect against tissue damage and/or electrolysis of claim 1, wherein the first pole is a negative pole and the at least one electronic conductor is in electronic contact with the negative pole, and wherein the electronic conductor is adapted to establish electronic contact with the positive pole and thereby short the battery after the battery is in the presence of the aqueous solution.

5. The battery with a safety mechanism adapted to protect against tissue damage and/or electrolysis of claim 1, wherein the electronic conductor is biased toward engagement with the other of the first and second poles such that the at least one electronic conductor, prevented from making electronic contact with the other of the first and second poles during normal use conditions, makes electronic contact with the other of the first and second poles after the spacer is in the presence of the aqueous solution.

6. The battery with a safety mechanism adapted to protect against tissue damage and/or electrolysis of claim 1, wherein the battery comprises first and second electronic conductors, wherein the first electronic conductor is in electronic contact with a positive pole, the second electronic conductor is in electronic contact with a negative pole, the spacer is positioned between the first and second electronic conductors, and one of the first and second electronic conductors is adapted to establish electronic contact with the other of the first and second electronic conductors and thereby short the battery after the battery is in the presence of the aqueous solution.

7. The battery with a safety mechanism adapted to protect against tissue damage and/or electrolysis of claim 1, wherein the electronic conductor comprises a metal, a metal alloy, a conductive polymer, a conductive composite, or any combination thereof.

8. The battery with a safety mechanism adapted to protect against tissue damage and/or electrolysis of claim 1, wherein the electronically insulating material comprises at least one water soluble material.

9. The battery with a safety mechanism adapted to protect against tissue damage and/or electrolysis of claim 1, wherein the electronically insulating material comprises sugar, polyether, polyacrylic acid (PAA), polyamide (PA), polyacrylate, polyvinyl alcohol, modified polyvinyl alcohol, acrylate copolymer, polyvinyl pyrrolidone, pullulan, gelatin, carboxymethyl cellulose (CMC), hydroxylpropylmethyl cellulose (HPMC), polyethylene oxide, polyethylene glycol, low viscosity grade hydroxypropylcellulose, polysaccharide, natural polymer, modified starches, copolymers of the foregoing, salts thereof or any combination thereof.

10. The battery with a safety mechanism adapted to protect against tissue damage and/or electrolysis of claim 1, the spacer comprising at least one hydrogel.

11. The battery with a safety mechanism adapted to protect against tissue damage and/or electrolysis of claim 1, wherein the spacer comprises $NaHPO_4$, sodium chloride (NaCl), potassium chloride (KCl), baking soda, sugar, sugar-like substances, citric acid, mixtures thereof, and any combinations thereof.

12. The battery with a safety mechanism adapted to protect against tissue damage and/or electrolysis of claim 1, wherein the resistivity of the electronic conductor is less than $20 \times 10^{-5}$ ohm-cm at 20° C., less than $5 \times 10^{-5}$ ohm-cm at 20° C., or between about $0.5 \times 10^{-5}$ ohm-cm at 20° C. and about $20 \times 10^{-5}$ ohm-cm at 20° C.

13. The battery with a safety mechanism adapted to protect against tissue damage and/or electrolysis of claim 1, wherein the resistance of the electronically insulating material is greater than 0.5 MOhms, greater than 5 MOhms, or greater than 500 MOhms.

14. The battery with a safety mechanism adapted to protect against tissue damage and/or electrolysis of claim 1, wherein the housing comprises a cathode can and an anode cup and either the spacer extends into the cathode can and surrounds the anode cup such that the anode cup cannot contact the cathode can or the spacer extends into the anode cup and surrounds the cathode can such that the cathode can cannot contact the anode cup.

15. The battery with a safety mechanism adapted to protect against tissue damage and/or electrolysis claim 1, wherein the spacer is disposed between an overhang portion of the electronic conductor and the other of the first and second poles.

16. The battery with a safety mechanism adapted to protect against tissue damage and/or electrolysis of claim 15, wherein the electronic conductor is attached to a cathode can of the battery.

17. The battery with a safety mechanism adapted to protect against tissue damage and/or electrolysis of claim 15, wherein the electronic conductor is electronically isolated from an anode cup of the battery.

18. The battery with a safety mechanism adapted to protect against tissue damage and/or electrolysis of claim 1, wherein the electronic conductor and the one of the first and second poles are of unitary construction.

19. The battery with a safety mechanism adapted to protect against tissue damage and/or electrolysis of claim 1, wherein the electronic conductor is disposed within the spacer.

20. The battery with a safety mechanism adapted to protect against tissue damage and/or electrolysis of claim 19, wherein the electronic conductor makes direct physical contact with the one of the first and second battery poles.

21. A battery with a safety mechanism adapted to protect against tissue damage and/or electrolysis comprising:
a housing comprising first and second poles, an electronic conductor, and first and second spacers comprising an electronically insulating material, wherein the first spacer is disposed between a first pole of the battery and the electronic conductor, the second spacer is disposed between a second pole of the battery and the electronic conductor, the electronic conductor is disposed between the first and second spacers, the spacers being capable of undergoing a physical change in the presence of an aqueous solution such that the spacers can dissolve, soften, or swell, and the electronic conductor being adapted to establish electronic contact with both the first and second poles in the presence of the aqueous solution wherein:
subsequent to the physical change, electronic contact occurs based on (i) direct physical contact between the electronic conductor and one or more of the first and second poles or (ii) indirect physical contact between the electronic conductor and one or more of the first and second poles via one or more additional intervening electronically conducting materials disposed between the electronic conductor and the one or more of the first and second poles.

\* \* \* \* \*